(12) United States Patent
Li et al.

(10) Patent No.: US 12,508,944 B2
(45) Date of Patent: Dec. 30, 2025

(54) TRACTION BATTERY CONTROLLER PROVIDING FAST AND ACCURATE STATE OF CHARGE STATUS

(71) Applicant: Ford Global Technologies, LLC, Dearborn, MI (US)

(72) Inventors: Yonghua Li, Ann Arbor, MI (US); Marcelo Araujo Xavier, Belleville, MI (US); Qi Jiao, Ann Arbor, MI (US); Justin T. Hughes, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 260 days.

(21) Appl. No.: 18/071,071

(22) Filed: Nov. 29, 2022

(65) Prior Publication Data

US 2024/0174122 A1    May 30, 2024

(51) Int. Cl.
*B60L 58/12* (2019.01)
*B60L 50/60* (2019.01)
*H01M 10/42* (2006.01)
*H01M 10/48* (2006.01)

(52) U.S. Cl.
CPC .............. *B60L 58/12* (2019.02); *B60L 50/60* (2019.02); *H01M 10/425* (2013.01); *H01M 10/48* (2013.01); *H01M 2220/20* (2013.01)

(58) Field of Classification Search
CPC ...... B60L 58/12; B60L 50/60; H01M 10/425; H01M 10/48; H01M 2220/20
See application file for complete search history.

(56) References Cited

U.S. PATENT DOCUMENTS

| 6,534,954 | B1 | 3/2003 | Plett |
| 8,880,253 | B2 | 11/2014 | Li et al. |
| 9,718,455 | B2 | 8/2017 | Yu et al. |

(Continued)

OTHER PUBLICATIONS

Domenico Di Domenico, et al. Lithium-Ion Battery State of Charge Estimation With a Kalman Filter Based on a Electrochemical Model.

(Continued)

*Primary Examiner* — Hitesh Patel
*Assistant Examiner* — Terry C Buse
(74) *Attorney, Agent, or Firm* — David B. Kelley; Brooks Kushman P.C.

(57) ABSTRACT

A traction battery controller of an electrified vehicle dynamically selects an estimation gain based on an operating condition of the vehicle and controls the vehicle according to a state (e.g., a state-of-charge (SOC)) of the traction battery estimated from an equivalent circuit model of the traction battery that depends on the estimation gain. The operating condition of the vehicle may be indicative of on-board energy (OBE) or a power demand of the vehicle. In operation, the controller selects the estimation gain to be (i) a high estimation gain during a first operating condition of the vehicle, whereby compared to a nominal estimation gain the battery state is estimated at an increased speed but with lower accuracy and (ii) a low estimation gain during a second operating condition of the vehicle, whereby compared to the nominal estimation gain the battery state is estimated with greater accuracy but at a decreased speed.

7 Claims, 8 Drawing Sheets

(56) References Cited

U.S. PATENT DOCUMENTS

| | | | |
|---|---|---|---|
| 2011/0166732 A1* | 7/2011 | Yu | B60W 10/04 |
| | | | 180/65.265 |
| 2014/0214268 A1* | 7/2014 | Li | B60L 3/12 |
| | | | 701/34.4 |
| 2019/0023130 A1* | 1/2019 | Garcha | B60W 50/0098 |
| 2022/0305952 A1* | 9/2022 | Klintberg | B60L 53/62 |

OTHER PUBLICATIONS

Wilson J. Rugh, et al., Research on gain scheduling, Survey Paper, Pergamon, Automatica 36 (2000) 1401-1425, Received Apr. 20, 1998; received in revised form Dec. 6, 1999.

* cited by examiner

TRACTION BATTERY CONTROLLER PROVIDING FAST AND ACCURATE STATE OF CHARGE STATUS

TECHNICAL FIELD

The present invention relates to detecting the state of charge of a traction battery of an electrified vehicle.

BACKGROUND

An electrified vehicle includes a traction battery for providing power to a motor of the vehicle to propel the vehicle. The state of charge of the traction battery may be monitored in controlling the operation of the vehicle and/or the traction battery.

SUMMARY

A vehicle includes a traction battery and a controller. The controller is configured to dynamically select an estimation gain based on an operating condition of the vehicle and to control the vehicle according to a state of the traction battery estimated from an equivalent circuit model of the traction battery that depends on the estimation gain.

The controller selects the estimation gain to be a high estimation gain during a first operating condition of the vehicle, whereby compared to a nominal estimation gain the state of the traction battery is estimated at an increased speed but with lower accuracy.

The controller selects the estimation gain to be a low estimation gain during a second operating condition of the vehicle, whereby compared to the nominal estimation gain the state of the traction battery is estimated with greater accuracy but at a decreased speed.

The controller selects the estimation gain to be the nominal estimation gain during a third operating condition of the vehicle.

The state of the traction battery may be a state-of-charge (SOC) of the traction battery.

The operating condition of the vehicle may be indicative of on-board energy (OBE) of the vehicle. In this case, the controller selects the estimation gain to be a high estimation gain when the OBE is greater than a predetermined value, whereby compared to a nominal estimation gain the SOC of the traction battery is estimated at an increased speed but with lower accuracy; and the controller selects the estimation gain to be a low estimation gain when the OBE is lesser than the predetermined value, whereby compared to the nominal estimation gain the SOC of the traction battery is estimated with a greater accuracy but at a decreased speed.

The operating condition of the vehicle may be indicative of a power demand of the vehicle. In this case, the controller selects the estimation gain to be a high estimation gain when the power demand is greater than a predetermined value and selects the estimation gain to be a low estimation gain when the power demand is lesser than the predetermined value.

The controller may be further configured to generate a distance-to-empty (DTE) value based on the estimated SOC of the traction battery.

The vehicle may be a battery electric vehicle (BEV).

A method for a vehicle having a traction battery includes dynamically selecting, by a controller, an estimation gain based on an operating condition of the vehicle. The method further includes controlling, by the controller, the vehicle according to a state of the traction battery estimated from an equivalent circuit model of the traction battery that depends on the estimation gain.

A system for a vehicle having a traction battery includes a controller. The controller is configured to dynamically select an estimation gain based on an operating condition of the vehicle and to control the vehicle according to a state of the traction battery estimated from an equivalent circuit model of the traction battery that depends on the estimation gain.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
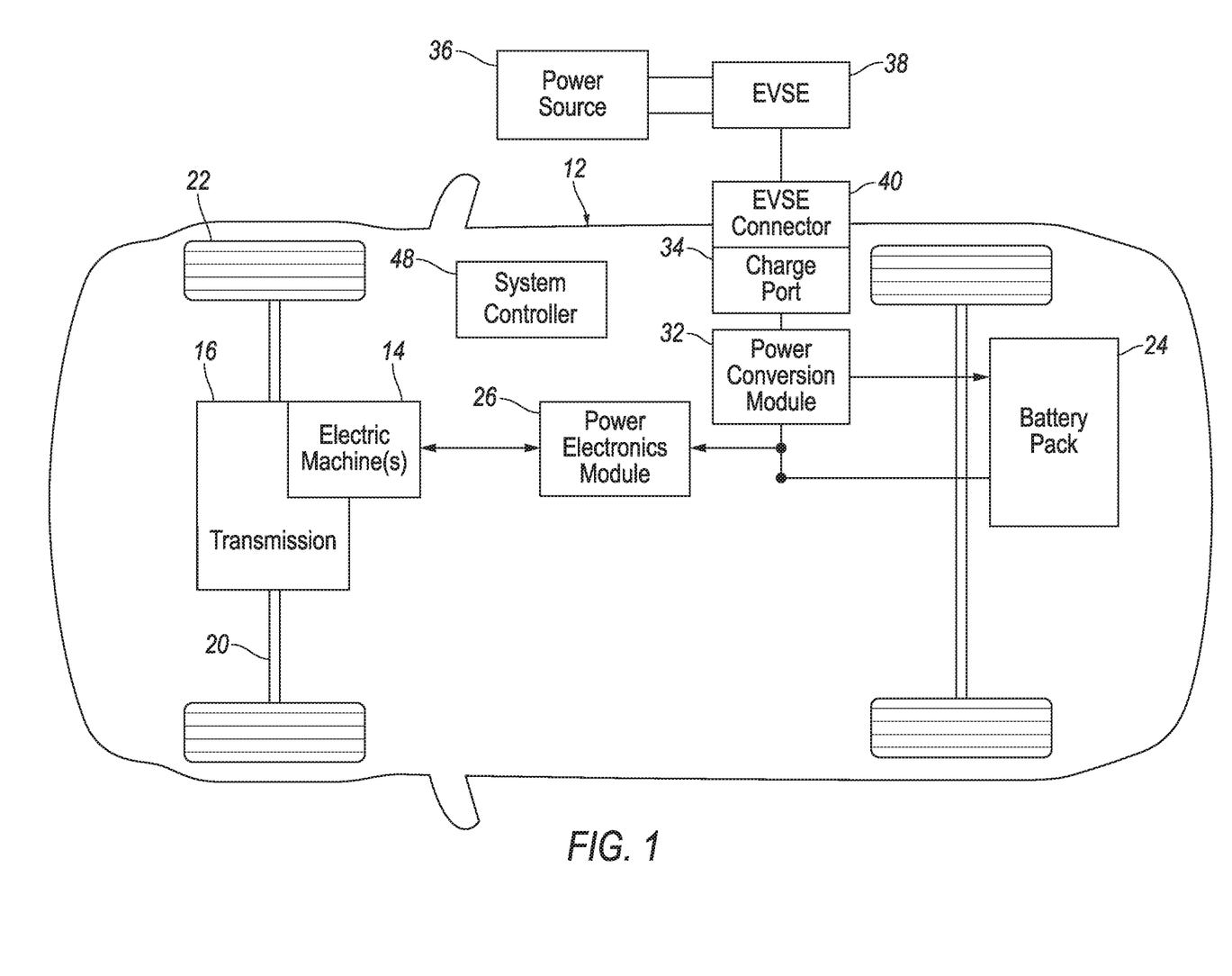
FIG. 1 illustrates a block diagram of a battery electric vehicle (BEV)

Referring now to FIG. 1, a block diagram of an electrified vehicle (EV) 12 in the form of a battery electric vehicle (BEV) is shown. BEV 12 includes a powertrain having one or more traction motors ("electric machine(s)") 14, a traction battery ("battery" or "battery pack") 24, and a power electronics module 26 (e.g., an inverter). In the BEV configuration, traction battery 24 provides all of the propulsion power and the vehicle does not have an engine. In other embodiments, the vehicle may be a hybrid electric vehicle (HEV) further having an engine.

Traction motor 14 is part of the powertrain of BEV 12 for powering movement of the BEV. In this regard, traction motor 14 is mechanically connected to a transmission 16 of BEV 12. Transmission 16 is mechanically connected to a drive shaft 20 that is mechanically connected to wheels 22 of BEV 12. Traction motor 14 can provide propulsion capability to BEV 12 and is capable of operating as a generator. Traction motor 14 acting as a generator can recover energy that may normally be lost as heat in a friction braking system of BEV 12.

Traction battery 24 stores electrical energy that can be used by traction motor 14 for propelling BEV 12. Traction battery 24 typically provides a high-voltage (HV) direct current (DC) output. Traction battery 24 may be a lithium-ion battery. Traction battery 24 is electrically connected to power electronics module 26. Traction motor 14 is also electrically connected to power electronics module 26. Power electronics module 26, such as an inverter, provides the ability to bi-directionally transfer energy between traction battery 24 and traction motor 14. For example, traction battery 24 may provide a DC voltage while traction motor 14 may require a three-phase alternating current (AC) current to function. Inverter 26 may convert the DC voltage to a three-phase AC current to operate traction motor 14. In a regenerative mode, inverter 26 may convert three-phase AC current from traction motor 14 acting as a generator to DC voltage compatible with traction battery 24.

Traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and BEV 12. External power source 36 may provide DC or AC electric power to EVSE 38. EVSE 38 may have a charge connector 40 for plugging into a charge port 34 of BEV 12.

A power conversion module 32 of EV 12, such as an on-board charger having a DC/DC converter, may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating BEV 12. In embodiments, controller 48 is a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Controller 48 may implement a battery energy control module (BECM) (not shown) in communication with traction battery 24. The BECM may act as a controller ("traction battery controller") for traction battery 24 and monitor and control the performance of the traction battery. The BECM may include an electronic monitoring system that manages temperature and charge state of battery cells of traction battery 24.

The BECM (i.e., controller 48) monitors the state of charge (SOC) of traction battery 24 for use in controlling BEV 12 and/or the traction battery. The SOC of traction battery 24 is indicative of the level of charge stored in the traction battery relative to the capacity of the traction battery. An accurate SOC estimate of traction battery 24 helps achieve accurate battery management, such as battery power capability estimation and distance to empty (DTE) calculation. Benefits of an accurate SOC estimate may further include a longer battery life as traction battery 24 is less likely to experience over charge or over discharge.

A concern with the BEV configuration is that, as traction battery 24 is the only propulsion energy source, BEV 12 may become stranded at a location inconvenient for recharging once the charge of the traction battery is completely depleted. Ordinarily, the user of BEV 12 relies on an on-board battery management system (BMS) implemented by controller 48 to inform how much charge is remaining (this amount may vary from an internal BMS estimate) and how far the vehicle can travel with the remaining charge.

However, due to challenges in accurate battery SOC estimation, such information may not be reliable. Consequently, for example, if the DTE based on the SOC estimate is fifty miles but BEV 12 can travel only forty miles for the current driver, then there is a reasonable chance that the BEV may not reach the desired charging station (e.g., home) before the charge is completely depleted. As such, it is desirable to have accurate SOC estimation throughout the drive cycle, especially as the DTE becomes closer to zero.

In monitoring traction battery 24, controller 48 may use model-based battery state estimation (e.g., battery SOC and power capability estimation). Either a lumped parameter model, such as an equivalent circuit model, or a more complicated electrochemical model is used to represent the battery cells of traction battery 24. Based on battery input and output data, controller 48 can use some adaptive estimation method, such as extended Kalman filter (EKF), to estimate battery states and model parameters. The states may include SOC and battery equivalent circuit model internal states such as voltages across the RC pairs. The parameters may be the resistances and capacitances of the equivalent circuit model.

In accordance with the present disclosure, in implementing the model-based battery state estimation, controller 48 considers control strategy with regards to where traction battery 24 is operating at (in terms of bulk temperature, SOC, and customer usage profile (off-roading, city driving, etc.)) and provides more accurate initialization of the EKF states when the BECM is powered up.

In this regard, controller 48 is operative to provide fast and accurate SOC estimation of traction battery 24 through a number of techniques. For instance, controller 48 may utilize the knowledge that closer initialization of EKF states to true values lead to faster convergence of the EKF and thus faster estimation of SOC (one of the states in the EKF). Controller 48 may consider that at times it is more desirable to use an adjustable estimation gain scheme to either speed up the SOC estimation process, or to provide more accurate estimation, based on on-board energy (OBE) counting after a charging event. Controller 48 may utilize the knowledge that the slopes of SOC-OCV (open circuit voltage) curves in (lithium-ion) batteries affect the SOC estimation accuracy, even when the OCV estimation accuracy remains constant. For example, the top and bottom SOC operation ranges (90-100%, 0-10%) provide relatively better voltage to SOC conversion accuracy compared with the middle SOC operation range. In general, controller 48 implements a systematic solution to utilize the above facts to the benefit of fast and accurate battery state and parameter estimation.

As will now be described in greater detail, in certain ways in implementing the systematic solution, controller 48 uses an adaptive energy (and/or power demand) based EKF gain for SOC estimation of traction battery 24. In this regard, controller 48 dynamically selects the EKF gain based on operating conditions (e.g., available on-board energy and/or power demand) of BEV 12. On the one hand, controller 48 selects the EKF gain to be relatively greater for faster estimation convergence during operating conditions of BEV 12 when greater error of the SOC estimation can be tolerated. On the other hand, controller 48 selects the EKF gain to be relatively lesser for more accurate SOC estimation during operating conditions of BEV 12 when slower estimation convergence can be tolerated for the benefit of more accurate SOC estimation. Controller 48 dynamically selects the EKF gain depending on the operating conditions of BEV 12 in such manners as the controller is programmed to recognize that a greater amount of error can be tolerated at certain times while slower convergence speeds can be tolerated at other times in order to thereby optimize the speed and accuracy at which the controller estimates the SOC of traction battery 24. Controller 48 is programmed in this way as such speedy and accurate estimation of the SOC is valued for purposes such as determining distances to empty.

1.0 Model-Based SOC Estimation: Formulation of the State Estimator

Figure 2:
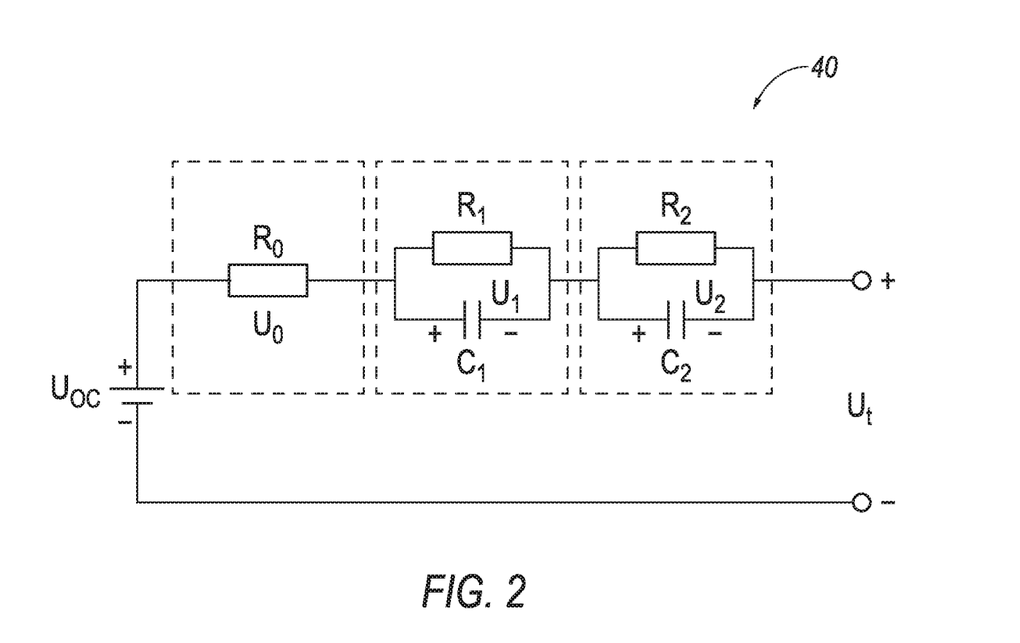
FIG. 2 illustrates a schematic diagram of a second-order equivalent circuit model of a battery cell of a traction battery of the BEV.

Existing control-oriented, model-based, battery state estimation methods use battery inputs (such as current) and responses (such as voltage and temperature) to estimate battery states such as SOC and battery model parameters such as equivalent resistance for the battery under study. With reference to FIG. 2, which illustrates a second-order equivalent circuit model 40 for a battery cell of traction battery 24, the second order equivalent circuit model and an extended Kalman filter (EKF) implementation are used to describe a model-based, battery state estimation method.

A discrete time state space equation for second-order equivalent circuit model 40 can be written as follows. The states (assuming the parameters are known):

$$\begin{bmatrix} \dfrac{dSOC(t)}{dt} \\ \dfrac{dU_1(t)}{dt} \\ \dfrac{dU_2(t)}{dt} \end{bmatrix} = \begin{bmatrix} \dfrac{-I(t)}{Q} \\ \dfrac{1}{C_1}I(t) - \dfrac{1}{R_1 C_1}U_1(t) \\ \dfrac{1}{C_2}I(t) - \dfrac{1}{R_2 C_2}U_2(t) \end{bmatrix} + \omega(t)$$

Here, Q is the capacity of traction battery 24 and w(t) is the "state noise" vector.

The output (assuming the "Open Circuit Voltage" (OCV) depends only on the SOC of traction battery 24):

$$U_t(t) = f(SOC) - R_0 * I(t) - U_1(t) - U_2(t) + v(t)$$

Here, v(t) is the output measurement noise.

A discretized version of the above equations, with a time step $T_s$:

$$\begin{bmatrix} SOC((k+1)T_s) \\ U_1((k+1)T_s) \\ U_2((k+1)T_s) \end{bmatrix} = \begin{bmatrix} SOC(kT_s) - T_s \dfrac{I(kT_s)}{Q} \\ \left(1 - \dfrac{T_s}{R_1 C_1}\right)U_1(kT_s) + \dfrac{T_s}{C_1}I(kT_s) \\ \left(1 - \dfrac{T_s}{R_2 C_2}\right)U_2(kT_s) + \dfrac{T_s}{C_2}I(kT_s) \end{bmatrix} + \omega(kT_s)$$

$$U_t(kT_s) = f(SOC(kT_s)) - R_0 * I(kT_s) - U_1(lT_s) - U_2(kT_s) + v(kT_s)$$

An extended Kalman filter (EKF) can be used to estimate the battery states (SOC, $U_1$, $U_2$) and battery model parameters online.

For an EKF used for estimating the states only, it is known that the SOC and the voltages $U_1$ and $U_2$ are set as EKF states, and the standard EKF techniques can be used to estimate the states. The pre-requisite is that all the other parameters such as the Rs and Cs in the equivalent circuit model are known in advance.

For the sake of simplicity, the parameters and the battery capacity are considered known yet with uncertainties. Charge efficiency is assumed to be one, so that factor is not listed in the equations.

For each time step, the input to the battery cell (current), and outputs from the battery cell (cell voltage, cell temperature (mapped from module temperature sensor readings)), are used to determine the model parameters and states.

On the other hand, for an EKF used for state and parameter estimation, an EKF with a much larger number of states is built. For example, in addition to SOC, $U_1$, and $U_2$, parameters such as $R_0$, $R_1$, $C_1$, $R_2$, $C_2$, and even battery capacity (Q), can be added as state variables. Again, the standard EKF can be used to estimate the state vectors (both the SOC, $U_1$, $U_2$ and all the other parameters).

In accordance with the present disclosure, in implementing the model-based battery state estimation, controller 48 can use both configurations.

1.1 Model-Based SOC Estimation: DTE Accuracy Requirement

As noted, the accuracy of the "distance to empty" (DTE) estimation for a BEV is valued, especially when the DTE is relatively close to zero. Generally, the DTE is large when the SOC is large and the DTE is small when the SOC is small. Thus, if the SOC estimation is too conservative and hence the DTE estimation is too conservative, then the BEV user may spend time charging on the road while there is in fact enough energy on board the vehicle to support the trip back home. Conversely, if the SOC estimation is too aggressive and hence the DTE estimation is too aggressive, then the BEV user may become stranded on the road without proper planning of charging stops.

The DTE of a BEV depends on the following quantities: user usage pattern of the vehicle, capacity of the traction battery, and the SOC of the traction battery. The capacity and the SOC of the traction battery determine the on-board energy (OBE) content of the traction battery.

Regarding the value placed on the accuracy of the DTE estimation, for most BEVs, a fully charged traction battery should be able to support a trip of at least 200 miles. As such, a DTE estimation that is off by 20-30 miles when the traction battery is fully charged is not consequential for range anxiety. On the other hand, when the battery on-board energy (OBE) level is getting closer to being completely depleted, the error on DTE becomes prominent. For example, if the true SOC is close to 0% while the DTE estimation indicates the traction battery can still run twenty miles, then the BEV is likely to run out of propulsion energy before reaching a charging station or home.

The above observation reveals the interesting fact that one of the SOC estimation accuracy requirements for a BEV depends on how much energy is left on-board. Although it is desirable to have accurate SOC estimation generally all the time, tradeoffs can be made based on the value of OBE to seek either faster estimation convergence or more accurate estimation of other values. For instance, in accordance with the present disclosure, controller 48 is operable to estimate the SOC by using faster estimation convergence and less accurate estimation when the value of the OBE is high and by using slower estimation convergence and more accurate estimation when the value of the OBE is low.

In accordance with the present disclosure, as described in greater detail below, controller 48 is operable to exploit numerous techniques for faster and higher accuracy SOC estimation.

1.2 Model-Based SOC Estimation: Estimator Gain and Estimation Accuracy

Figure 3:
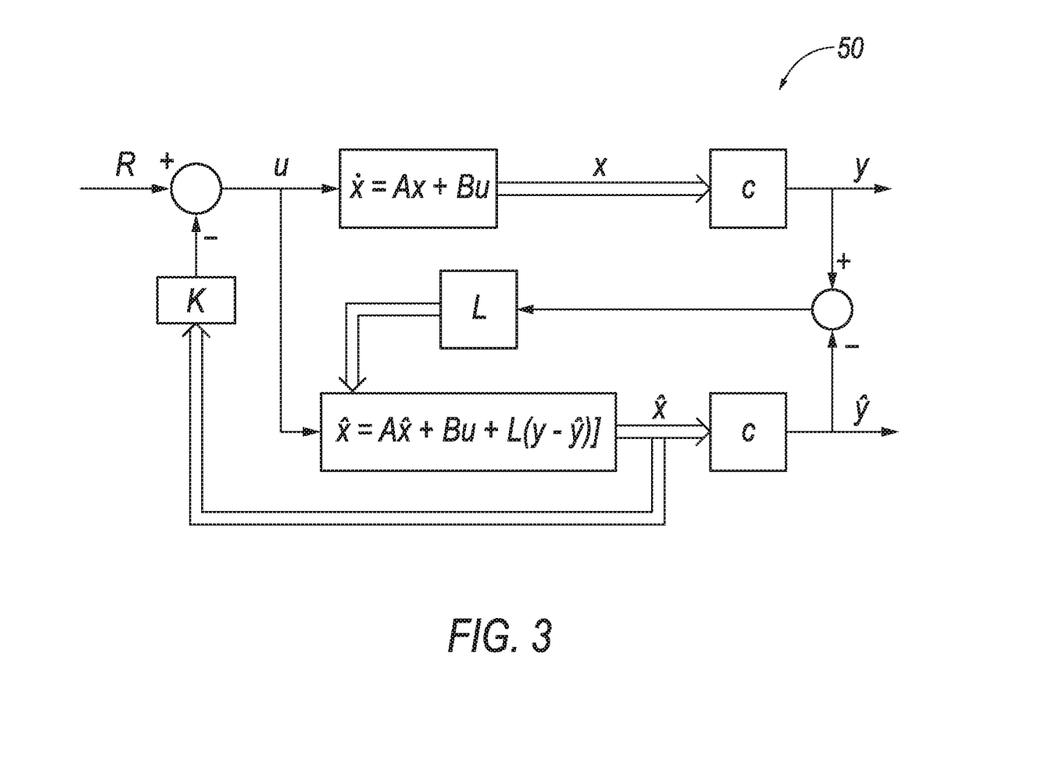
FIG. 3 illustrates a block diagram of a linear observer with gain matrix.

FIG. 3 illustrates a block diagram 50 of a linear observer with gain matrix. Using this simple linear observer setting, it can be determined that the state estimation errors (which include the SOC estimation error for most traction battery model-based estimation schemes) can be linked to the estimator gain (the L matrix) and the projection error (y-ŷ).

The gain L plays two roles, among other things (such as guaranteeing closed loop system stability). First, the gain L determines the speed of the estimation (i.e., how fast the estimation is). Basically, a larger value of the estimator gain (assuming a single variable) produces faster estimation convergence, but the error (for example, current measurement error, R0 resistance value error) will be amplified more. On the other hand, a smaller value estimator gain produces slower estimation convergence and the error in input/output measurements and parameters will be less amplified as compared with a larger gain. Second, when there are parameter uncertainties among the various parameter matrices A, B, C, D and input R, the gain L normally amplifies the error and passes it to both state and output estimation error. The larger the gain, the larger the estimation errors can be. The same can be said about the extended Kalman filter (EKF).

Figure 4:
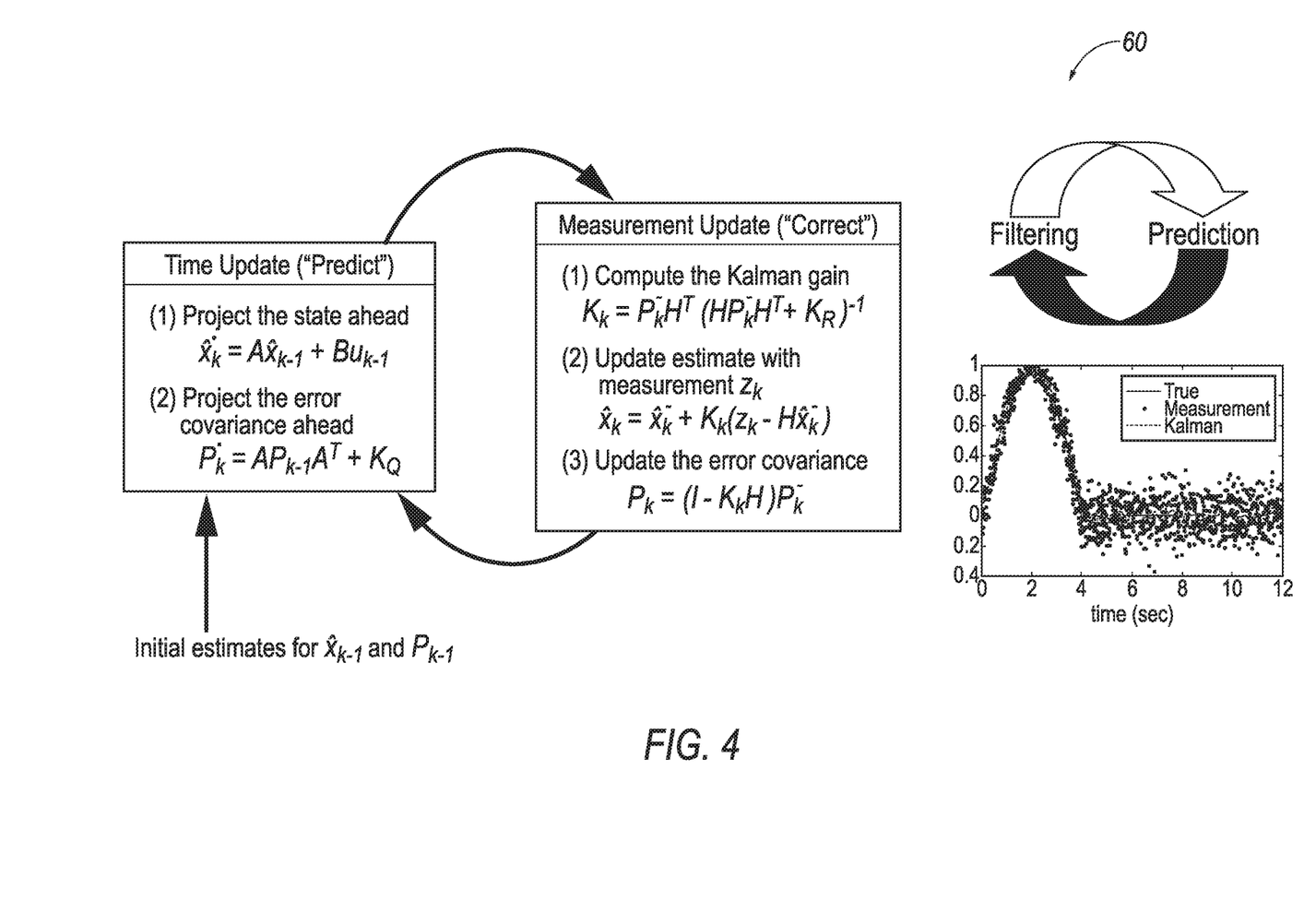
FIG. 4 illustrates a drawing depictive of configuration of an extended Kalman filter (EKF)

FIG. 4 illustrates a drawing 60 depictive of configuration of an EKF. Here, the state is first predicted, and then corrected by adding the projection error with a gain K, which is obtained through a series of matrix manipulations. The matrices $K_R$ and $K_Q$ determine mostly the gain K of the EKF. As known to those of ordinary skill in the art, one of the state variables is SOC (or open circuit voltage (OCV)) for the EKF. The convergence of the EKF provides an estimation of the SOC.

Initialization means to set up the initial values for the state vectors in EKF operation. EKF gain (as shown) is normally inversely proportional to $K_R$. So, with a higher $K_R$, the EKF has a smaller gain. For example, if under certain operating conditions, a larger EKF gain is preferred, then a smaller $K_R$ or a larger $K_Q$ or a combination of both is chosen. On the other hand, if a smaller EKF gain is preferred, then a larger $K_R$ or a smaller $K_Q$ or a combination of both is chosen.

2.0 Techniques for Fast and Accurate SOC Estimation

Figure 5:
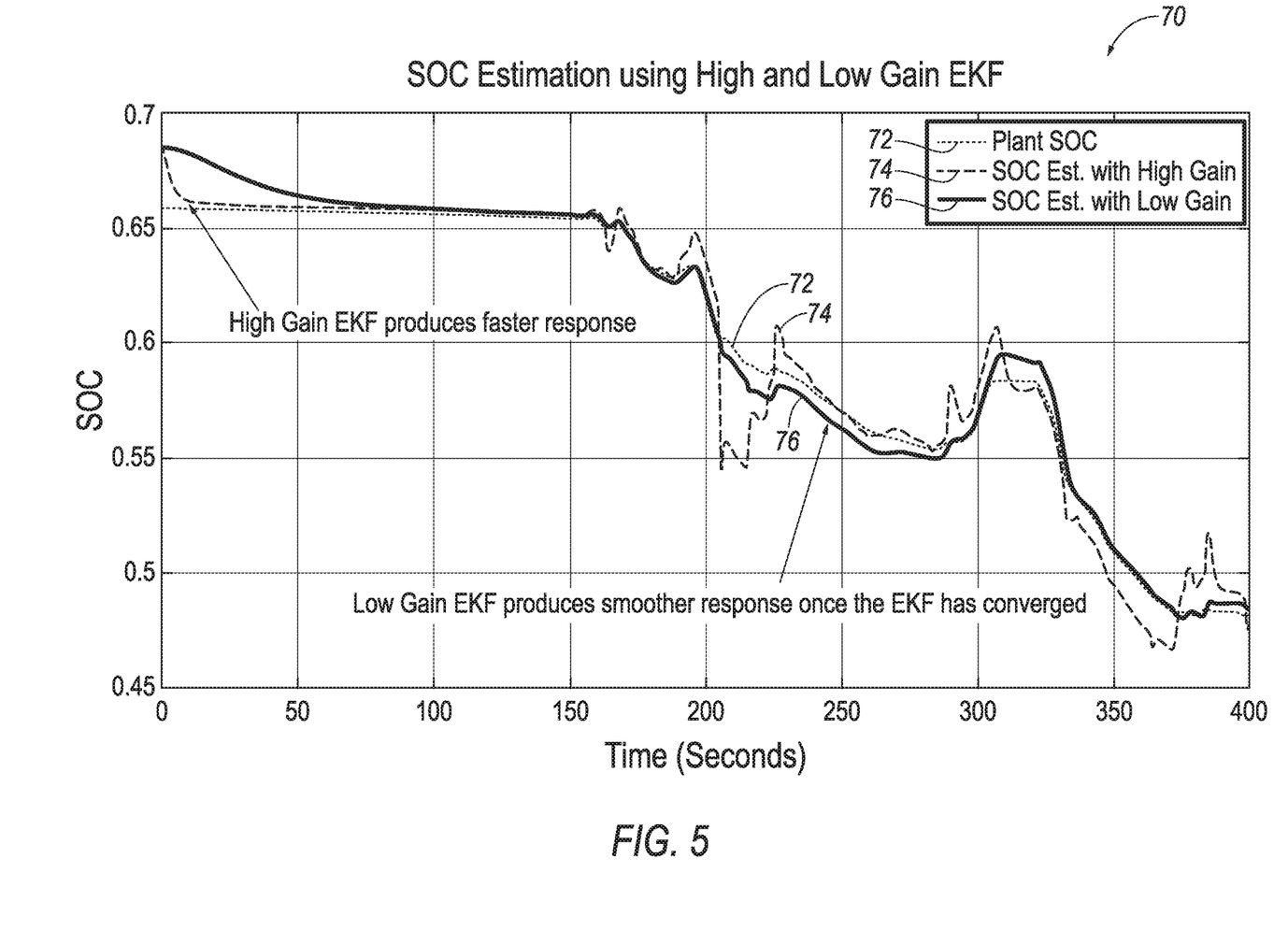
FIG. 5 illustrates a graph depictive of state of charge (SOC) estimation using high and low gain EKF, the graph including a plot of an exemplary actual SOC, a plot of an estimation of the SOC using a high gain EKF, and a plot of an estimation of the SOC using a low gain EKF.

Referring now to FIG. 5, a graph 70 depictive of SOC estimation using high and low gain EKF is shown. Graph 70 includes a plot 72 of an exemplary actual SOC, a plot 74 of an estimation of the SOC using a high gain EKF, and a plot 76 of an estimation of the SOC using a low gain EKF. Graph 70 is provided for use in describing operations of controller 48 that contribute to fast and accurate SOC estimation in model-based battery controls design.

A comparison of plots 72, 74, and 76 of graph 70 illustrates how EKF gain affects SOC estimations. (EKF gain also affects parameter estimations in like manner.) Plots 72, 74, and 76 were obtained using a 2RC equivalent circuit model to demonstrate the idea. The EKF estimates both the SOC and circuit parameters (except the capacity).

From this example depictive by graph 70, a high gain EKF produces faster response, which is helpful in driving the estimation toward the true value (in this case, the plant SOC). On the other hand, a low gain EKF produces better quality estimation (in terms of proximity to the plant SOC), compared with the high gain EKF based SOC estimation.

2.1 Techniques for Fast and Accurate SOC Estimation: Fast and Accurate Learning with High/Low OBE A. On-Board Energy (OBE)

For a BEV with a known trip destination and a known OBE, it is possible to schedule the estimator gain in a way that the SOC estimation error has relatively far less effect on DTE accuracy when it matters the most (e.g., less than calibratable miles from 0% customer SOC).

The calculation of the OBE around the time a charge event is completed is as follows. For either fully or partially charged situations, the total OBE can be inferred from the traction battery capacity (assumed to be given) and the traction battery SOC (can be directly inferred from battery model parameters, battery cell voltage, and charge current at the end of charging). It is assumed that the OBE is more than the energy needed to reach the destination of current drive. For example, given SOC(t) (and thus OCV(t)), SOCmin (and thus OCVmin), and the capacity, the OBE can be roughly estimated to be:

$$OBE(t)=(SOC(t)-SOCmin)*Capacity$$

B. Find Initial OBE when BECM is Powered Up

Another variable to deal with is the initial SOC. One approach is the following: at BECM power up, obtain time since last high-voltage (HV) loop disconnect. When the elapsed time is large enough, the initial SOC may be obtained from the OCV-SOC relationship. When the elapsed time is too short, the initial SOC may be obtained by using some other known method.

C1. OBE Based EKF Gain Selection: Project Remaining SOC after Current Drive

Once the BEV is keyed-on and the drive route is provided, controller 48 can use existing technology to predict the energy required to get to the destination. With this information, controller 48 first determines whether, at the end of the drive, there will be 10% or more SOC left. Controller 48 can do this using the following calculations:

Let starting OBE=OBE0

Let route-based energy use estimation: EnerUsed

This will give left over OBE at the end of drive as: OBEleft=OBE0−EnerUsed.

Controller 48 can translate OBEleft to remaining SOC on board after the drive. This can be calculated recursively:

Let SOCleft=SOCmin

Let SOCleft=SOCleft+0.1%. If (SOCleft−SOCmin)*
   Q>OBEleft or if SOCleft>=100%, then stop.
   Otherwise, repeat.

The end SOCleft is then compared with SOC=10%. If SOCleft>10%, then there is more than 10% SOC left after current drive cycle. If SOCleft<10%, then there is less than 10% SOC left after current drive cycle. (The 10% SOC is calibratable. Typically, this is enough margin for the vehicle driver to drive to a charging station or home, if needed.)

Once it is determined that more than 10% SOC is expected after the current drive, controller 48 can resort to using high or nominal gain EKF estimation. This can be set as the default case.

C2. OBE Based EKF Gain Selection: High/Low Gain EKF Estimation

Figure 6:
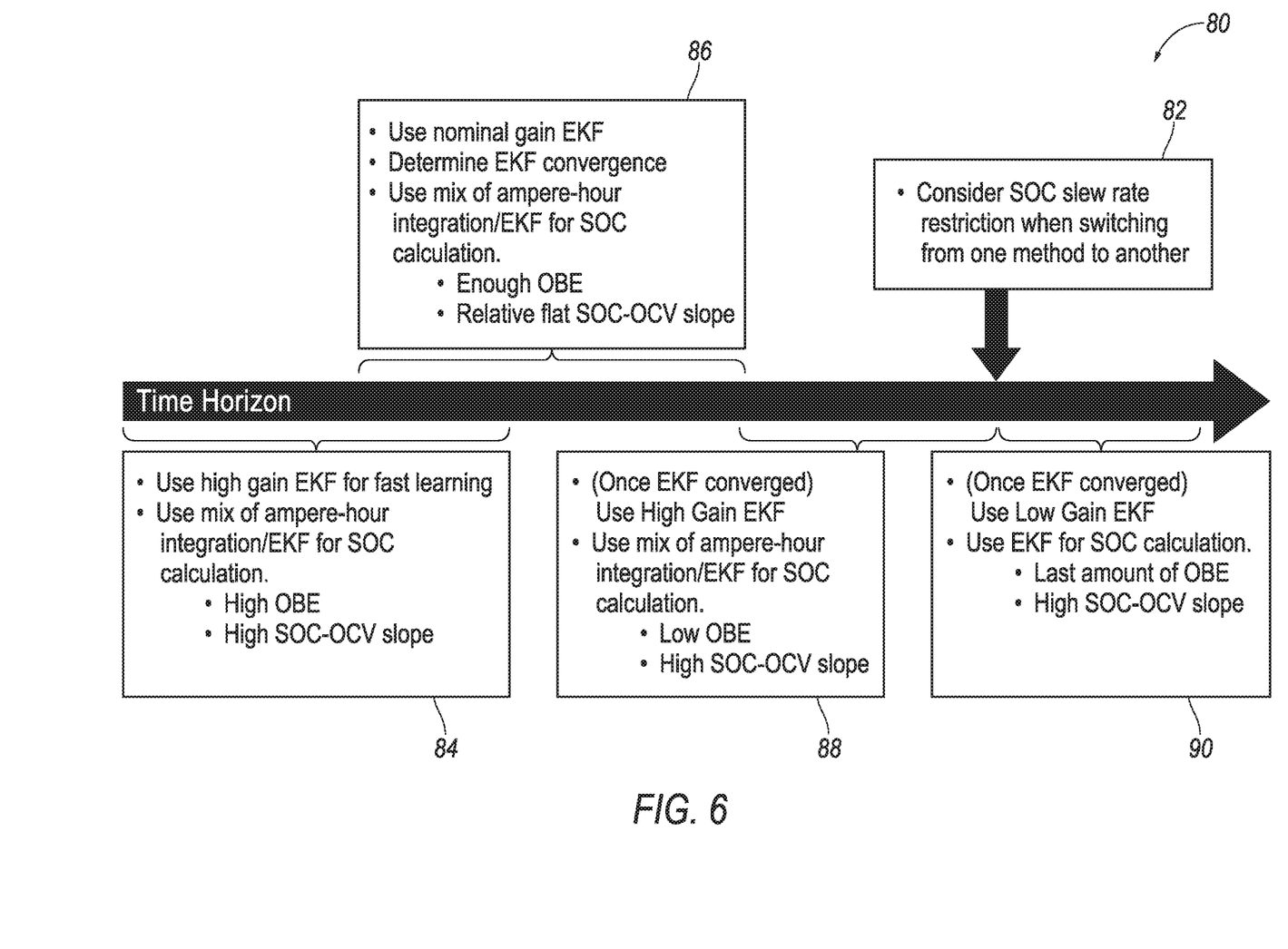
FIG. 6 illustrates a timing diagram indicative of operation of a traction battery controller of the BEV dynamically selecting the EKF gain based on operating conditions of the BEV, the operating conditions involving the on-board energy (OBE) of the BEV.
Figure 7:
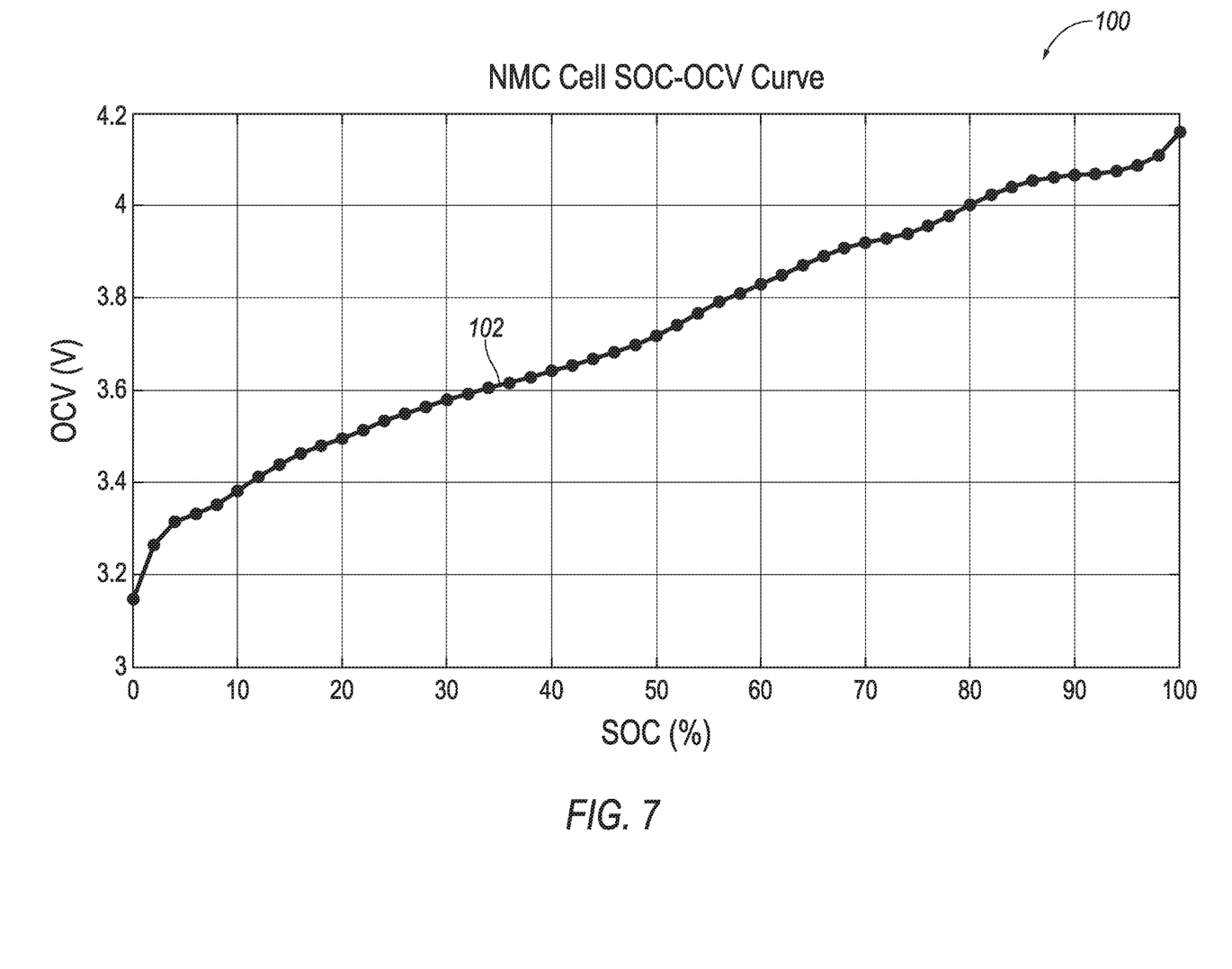
FIG. 7 illustrates a graph having a plot an exemplary SOC-OCV (open circuit voltage) curve.

Referring now to FIG. 6, a timing diagram 80 indicative of operation of controller 48 dynamically selecting the EKF gain based on operating conditions of BEV 12 is shown. In this case, the on-board energy (OBE) of BEV 12 is the considered operating condition of the BEV whereby controller 48 uses an adaptive energy based EKF gain for SOC estimation of traction battery 24. In particular, controller 48 uses a gain-scheduling strategy to run the EKF for both state and parameter estimations with consideration of OBE content, SOC-OCV curve slope, and what EKF gain can affect the convergence and accuracy of EKF based battery SOC estimation. For reference, FIG. 7 illustrates a graph 100 having a plot 102 of an exemplary SOC-OCV curve.

The SOC estimation slew rate is respected throughout the switch, as indicated by block 82. How to meet the slew rate requirement is a common practice. EKF gain adjustment can be achieved by either decreasing the $K_R$ in the EKF, or by momentarily increasing (bumping) the matrix element corresponding to the SOC state in state covariance P matrix.

At the start of the drive, the EKF is running at high gain, and the battery SOC estimation output from controller 48 is a mix of ampere-hour integration method and EKF based output, as indicated by block 84. Here, the SOC-OCV slope is high (when fully charged) with equivalent OBE corresponding to SOC of at least 90%. The power capability uses lookup-table based power limit rather than EKF output based calculations. The reason is that the OBE is high and there is unlikely chance of overdrawing the traction battery.

The SOC used is counted by direct current integration. Once the SOC has dropped a calibrated amount (for example, X %) during the drive, the traction battery reaches a middle of range OBE, with the SOC-OCV curve in the relatively flat region. Here, controller 48 checks to see if the EKF has converged.

When the SOC after the gain switch has been over Y % (calibratable) but the total SOC remaining is still higher than 10% (or the start of steep SOC-OCV region at the lower end) and if the EKF has converged, switch to nominal gain and count the SOC used after the switch using a mixture of ampere-hour integration and EKF outputs for SOC, with more weight to EKF based estimation, as indicated in block 86. EKF based power capability estimation is used in this case. Otherwise, switch to lower gain and count the SOC after the switch using a mixture of ampere-hour integration and EKF outputs for SOC, with more weight to ampere-hour integration-based estimation. A lookup table-based power capability estimation is used in this case. Otherwise, go to the last SOC region (<10%).

For the last 10% or so SOC region (where the SOC-OCV is the steepest), there are two different operating configurations. At low SOC, SOC accuracy has increased importance compared to the rest of the SOC range. Because the SOC/OCV curve is steep and voltage sensor measurement accuracy is superior to the current sensor measurement accuracy, EKF closed-loop estimation is prioritized more than current integration open-loop results in this condition.

When the SOC (based on OBE counting) is lower than 10% (or in the steep SOC-OCV region at the lower end) but still higher than a given threshold, switch to high gain EKF for SOC estimation using a mixture of ampere-hour integration and EKF output as SOC estimation, with more weight toward EKF based output, as indicated in block 88. Otherwise (the traction battery has entered the last remaining OBE), switch to low gain EKF (to achieve higher accuracy), and use EKF output SOC as battery SOC, as indicated in block 90. EKF based power capability estimation is used for both situations.

The operational steps of controller 48 outlined by blocks 84, 86, 88, and 90 of timing diagram 80 provide the following. First, the SOC-OCV curve is considered in the EKF gain deployment. When the SOC-OCV curve is steeper, higher gain is used so the battery states are learned faster without adversely amplifying the measurement error in voltage. Second, the OBE is considered in that SOC estimation error (either EKF output or a mixture of ampere-hour integration and EKF output) does not lead to battery over discharge, or distance-to-empty calculation error does not cause the BEV to become stranded. Third, EKF convergence is considered in that, for converged EKF, its output is used more (with higher weight, for example, in the mix of ampere-hour integration-based SOC and EKF based SOC), and power capability uses EKF based output.

C3. OBE Based EKF Gain Selection: End of Drive

Once the destination is reached, for the case of converged EKF, the output variables (state, parameters such as SOC, equivalent circuit model parameters) are stored in a memory associated with controller 48 for next start-up use.

2.2 Techniques for Fast and Accurate SOC Estimation: Fast and Accurate Learning with High/Low Power Demand A. Current Sensor Error and Effect on EKF Current sensor error (the difference between true value and the measurement value) can typically be described as (i) at higher current (for example abs(current)>50 A), the current measurement error is 1% of measurement value and (ii) at lower current (for example abs(current)<50 A), the error is fixed at the low end of the linear range.

Figure 8:
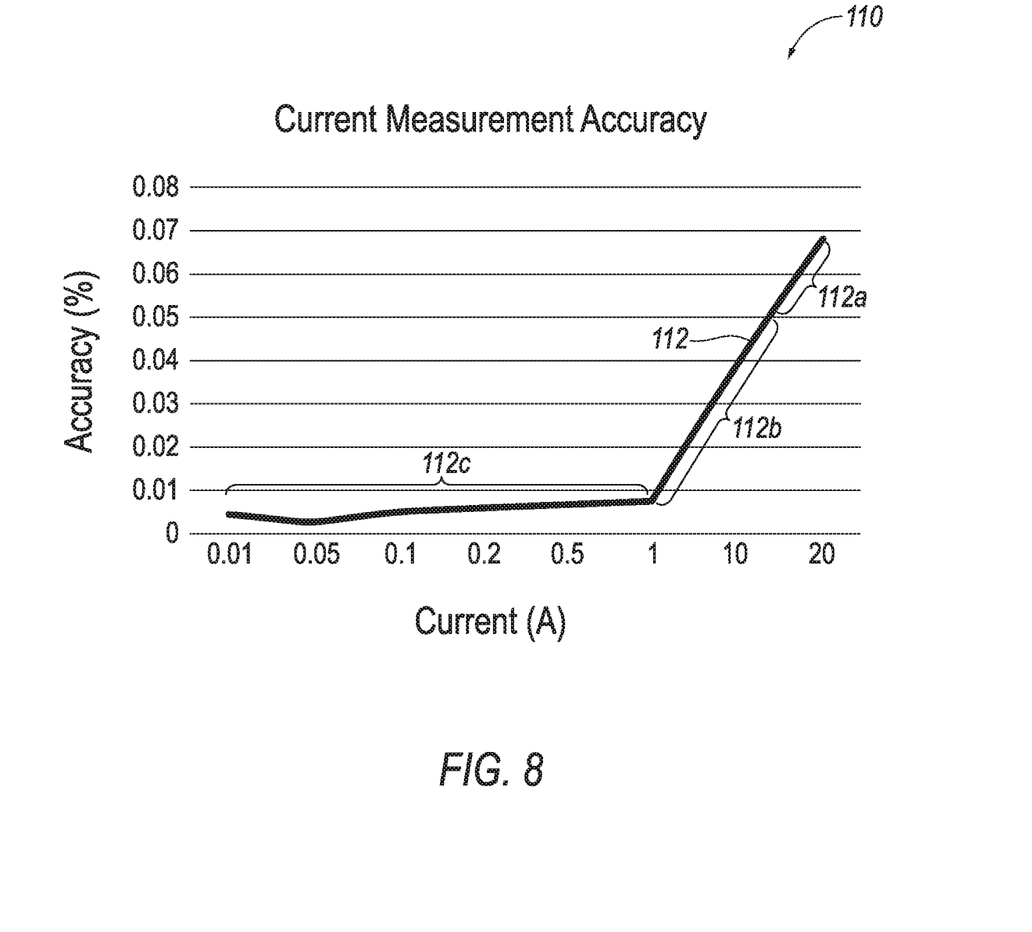
FIG. 8 illustrates a graph having a plot of an exemplary current measurement accuracy.

FIG. 8 illustrates a graph 110 having a plot 112 of an exemplary current measurement accuracy. Plot 112 provides an example of shunt type current sensor accuracy profile. At low currents, measurement error is close to some constant value, regardless of the actual current. At higher currents, measurement error is proportional to measured current.

Controller 48 can exploit this behavior when the EKF gain is considered. In this regard, recall that EKF runs on the assumption that the error between measured voltage (Vcell) and projected cell voltage is fed back to the system, and the internal feedback mechanism is used to correct such error. A major contributor of the EKF projection voltage error is Current*R0, where current is the current as measured, and R0 is the Ohmic resistance.

Denote measured current as: I+ΔI, where ΔI is the current measurement error. The relative current error would then be: ΔI/I. As such, at a low current, the current error will be unfavorably amplified by the EKF (through its feedback mechanism), as compared with a high current (on the scale of percentage). This applies to the situation that battery model parameters are perfectly learned. A conclusion is that during low power demand, the absolute voltage error can be made compatible with high power demand situation with higher gain for the EKF.

The reasoning can be stated as follows: assuming a simple R model is used, then the voltage error of the EKF can be mostly summarized as $|Verror|=\sqrt{(\Delta I^*R)^2+(I^*\Delta R)^2}$. Now, assume R is learned without significant error (which is possible due to its observability within the framework of model-based parameter and state estimation), so for smaller ΔI, a higher gain can be used to get same level of compensated Verror. However, if power is too low, then the signal-to-noise (SNR) ratio will be too low, and then it is better for the estimator to be "off" (see on/off logic described below).

B. Gain Scheduling Based on Power Demand Zone: Power Demand Filtering

Figure 9:
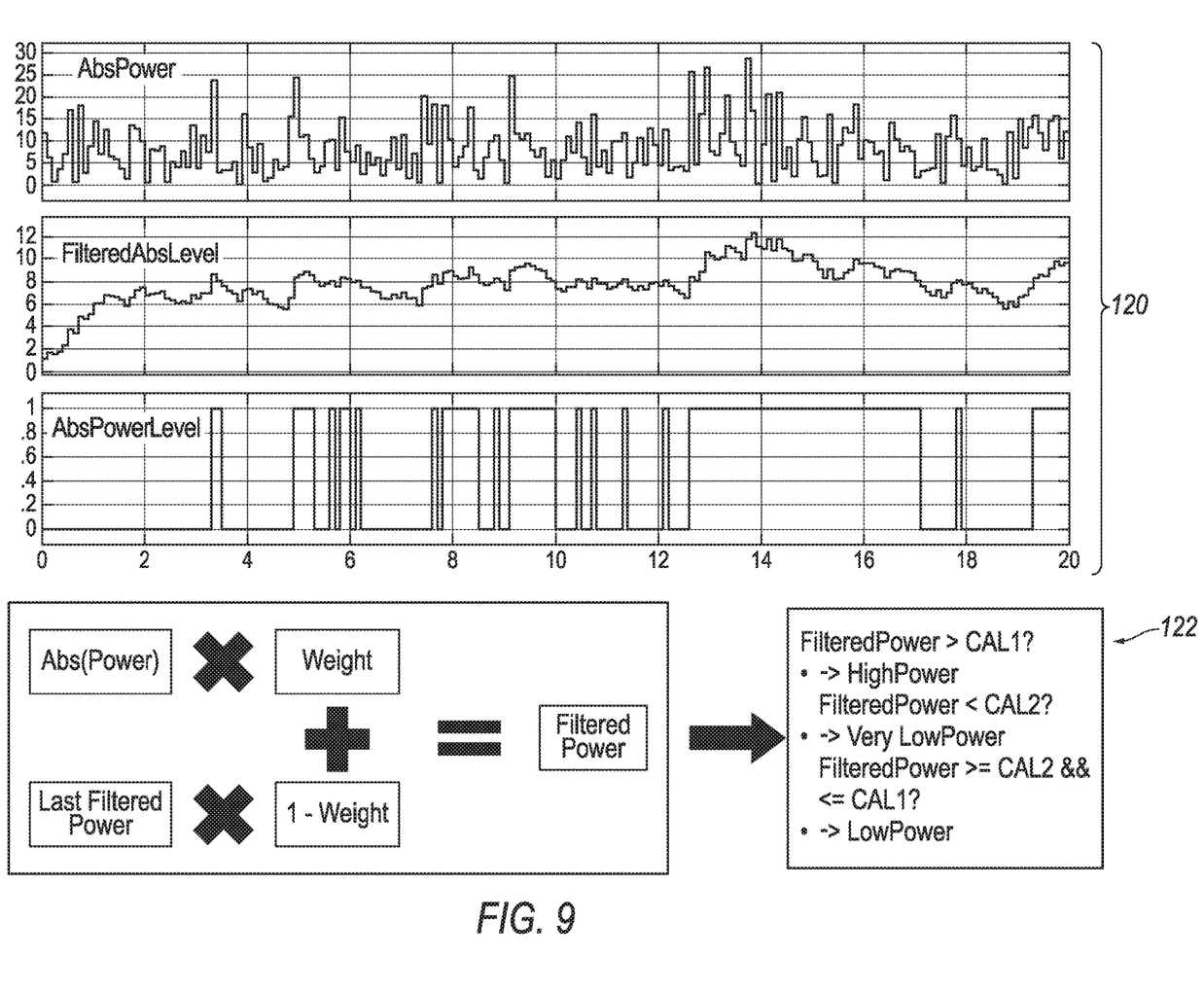
FIG. 9 illustrates a series of power graphs in conjunction with a block diagram descriptive of power level determination logic carried out by the traction battery controller in dynamically selecting the EKF gain based on power demand.

FIG. 9 illustrates a series of power graphs 120 in conjunction with a block diagram 122 descriptive of power level determination logic carried out by controller 48 in dynamically selecting the EKF gain based on power demand.

It may be advantageous to use different EKF gains when the input current changes (i.e., when the power demand changes). To correctly use the current "amplitude" while minimizing unnecessary frequent gain scheduling of the EKF, the following filtering approach may be used.

The input power (for example, power demand) through pedal-based power request, plus the HVAC related power request, can be filtered using an infinite impulse response (IIR) filter. For example, the following filter implementation can be used:

PowerDemand=Propulsion Power Demand+HVAC Power Demand $P\_zone$=PowerDemand*weight+$P\_zone\_last$*(1−weight).

The weight can be calibrated.

The idea from the P_zone determination is that the output from the filtering will be relatively smoother, as compared with individual PowerDemand at every instant of sampling time.

The following is a simple example. The first is the raw power demand, the second is the IIR-filtered power demand, and the third comes from the decision logic of whether it is high or low (assuming the threshold is 8 KW). Based on the high or low designation, the EKF gain can be assigned correspondingly.

As described earlier, the high gain portion is used when the power demand is high (and the current sensor error is relatively low.)

In short, the logic carried out by controller 48 for using the power demand to determine the EKF gain is as follows. Initially, the raw power demand is determined, and then the wave filter is used to get the filtered power demand. When the filtered value is greater than a calibration value, controller 48 uses a low EKF gain; see region 112a of plot 112 of current measurement accuracy graph 110 shown in FIG. 8—this is the "high power" demand. When the filtered value less than the calibration value but greater than a second lower calibration value, controller 48 uses a high EKF gain; see region 112b of plot 112 of graph 100—this is the "low power" demand. Otherwise, controller 48 switches off the gain estimator; see region 112c of plot 112 of graph 100—this is the "very low power" demand. (Note that the current sensor error curve as embodied by current measurement accuracy graph 110 is for demonstration only as the traction battery current sensor normally has range up to 800 A.)

As described, in accordance with the present disclosure, a traction battery controller of an electrified vehicle employs an adaptive EKF gain based on on-board energy (OBE) and/or power demand of the vehicle for estimating the SOC of the traction battery to thereby provide fast and accurate estimation of the SOC. In this way, the controller employs a model-based SOC estimation strategy in which the estimation gain is dynamically selected based on operating conditions of the vehicle.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A vehicle comprising: a traction battery; and a controller configured to dynamically select an estimation gain based on a power demand of the vehicle, and to control the vehicle according to a state-of-charge (SOC) of the traction battery estimated from an equivalent circuit model of the traction battery that depends on the estimation gain, wherein the controller selects the estimation gain to be a high estimation gain when the power demand is greater than a predetermined value and selects the estimation gain to be a low estimation gain when the power demand is lesser than the predetermined value.

2. The vehicle of claim 1 wherein: the controller is further configured to generate a distance-to-empty (DTE) value based on the estimated SOC of the traction battery.

3. The vehicle of claim 1 wherein:
the vehicle is a battery electric vehicle (BEV).

4. A method for a vehicle having a traction battery, the method comprising: dynamically selecting, by a controller, an estimation gain based on a power demand of the vehicle; controlling, by the controller, the vehicle according to a state-of-charge (SOC) of the traction battery estimated from an equivalent circuit model of the traction battery that depends on the estimation gain; and wherein dynamically selecting the estimation gain based on the power demand of the vehicle includes selecting the estimation gain to be a high estimation gain when the power demand is greater than a predetermined value and selecting the estimation gain to be a low estimation gain when the power demand is lesser than the predetermined value.

5. The method of claim 4 wherein: controlling the vehicle according to the estimated state of the traction battery includes generating a distance-to-empty (DTE) value based on the estimated SOC of the traction battery.

6. A system for a vehicle having a traction battery, the system comprising: a controller configured to dynamically select an estimation gain based on a power demand of the vehicle, and to control the vehicle according to a state-of-charge (SOC) of the traction battery estimated from an equivalent circuit model of the traction battery that depends on the estimation gain, wherein the controller selects the estimation gain to be a high estimation gain when the power demand is greater than a predetermined value and selects the estimation gain to be a low estimation gain when the power demand is lesser than the predetermined value.

7. The system of claim 6 wherein: the controller is further configured to generate a distance-to-empty (DTE) value based on the estimated SOC of the traction battery.

* * * * *